(12) United States Patent
Koecher et al.

(10) Patent No.: US 7,371,511 B2
(45) Date of Patent: *May 13, 2008

(54) POLYDIACETYLENE POLYMER BLENDS

(75) Inventors: Steven D. Koecher, New Brighton, MN (US); Richard G. Hansen, Mahtomedi, MN (US); Jeffrey J. Cernohous, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 131 days.

This patent is subject to a terminal disclaimer.

(21) Appl. No.: 10/922,091

(22) Filed: Aug. 19, 2004

(65) Prior Publication Data

US 2006/0041057 A1    Feb. 23, 2006

(51) Int. Cl.
    C08F 38/00    (2006.01)
    C08F 2/46     (2006.01)
    B32B 27/00    (2006.01)

(52) U.S. Cl. .................. 430/348; 430/346; 430/364; 428/500; 522/162; 522/174; 522/150; 522/152; 522/153; 522/154; 522/173; 522/178; 522/182; 526/285

(58) Field of Classification Search ............ 526/931, 526/285; 522/164, 176, 162, 174, 150, 152, 522/153, 154, 173, 178, 182; 430/348, 346, 430/364; 428/500
    See application file for complete search history.

(56) References Cited

U.S. PATENT DOCUMENTS

| | | | |
|---|---|---|---|
| 3,709,860 A | 1/1973 | Fischer et al. ............. 260/77.5 |
| 3,999,946 A | 12/1976 | Patel et al. .................... 23/253 |
| 4,215,208 A | 7/1980 | Yee et al. .................... 526/285 |
| 4,238,352 A | 12/1980 | Patel .......................... 252/408 |
| 4,242,440 A | 12/1980 | Yee et al. .................... 430/346 |
| 4,389,217 A | 6/1983 | Baughman et al. ............. 436/2 |
| 4,708,019 A | 11/1987 | Rubner et al. ................. 73/760 |
| 4,721,769 A * | 1/1988 | Rubner ......................... 528/75 |
| 4,767,826 A | 8/1988 | Liang et al. ................. 525/421 |
| 4,849,500 A * | 7/1989 | Rubner ........................ 528/345 |
| 4,916,211 A * | 4/1990 | Rubner ........................ 528/480 |
| 5,156,810 A | 10/1992 | Ribi ......................... 422/82.01 |
| 5,491,097 A | 2/1996 | Ribi et al. .................. 436/518 |
| 5,554,686 A | 9/1996 | Frisch, Jr. et al. .......... 524/588 |
| 5,571,568 A | 11/1996 | Ribi et al. .................. 427/487 |
| 5,622,872 A | 4/1997 | Ribi .......................... 436/518 |
| 5,672,465 A | 9/1997 | Patel et al. ................. 430/332 |
| 5,685,641 A | 11/1997 | Ribi .......................... 374/162 |
| 5,692,937 A | 12/1997 | Zhang ......................... 442/149 |
| 5,929,160 A | 7/1999 | Krepski et al. ............. 524/590 |
| 6,103,217 A | 8/2000 | Charych .................. 424/9.321 |
| 6,518,359 B1 * | 2/2003 | Clemens et al. ............ 524/840 |
| 6,607,744 B1 * | 8/2003 | Ribi .......................... 424/439 |
| 6,642,304 B1 | 11/2003 | Hansen et al. ............... 524/590 |
| 6,963,007 B2 | 11/2005 | Hays et al. .................. 558/333 |
| 2004/0126897 A1 | 7/2004 | Prince et al. ................ 436/518 |
| 2004/0132217 A1 | 7/2004 | Prince et al. ................ 436/518 |
| 2005/0137375 A1 | 6/2005 | Hansen et al. ................. 528/44 |
| 2006/0041099 A1 * | 2/2006 | Cernohous et al. ............ 528/44 |
| 2006/0134796 A1 | 6/2006 | Bommarito et al. ........ 436/166 |

FOREIGN PATENT DOCUMENTS

| | | |
|---|---|---|
| WO | WO 96/25665 A1 | 8/1996 |
| WO | WO 97/27316 A1 | 7/1997 |
| WO | WO 98/04743 A1 | 2/1998 |
| WO | WO 98/36263 A1 | 8/1998 |
| WO | WO 98/39632 A1 | 9/1998 |
| WO | WO 99/10743 A1 | 3/1999 |
| WO | WO 99/67423 A1 | 12/1999 |
| WO | WO 02/00920 A2 | 1/2002 |

OTHER PUBLICATIONS

Valverde et al. Some Novel Photosensitive Diacetylene Diurethanes and Their Mixtures in Common Polymers. Polymers for Advanced Technologies (1996), 7(1), 27-30.*

Mino, N. et al.; "Photoreactivity of 10,12-Pentacosadiynoic Acid Monolayers and Color Transitions of the Polymerized Monolayers on an Aqueous Subphase"; Langmuir 1992, vol. 8, p. 594-598.

Chance, R.R. et al.; "Thermal effects on the optical properties of single crystals and solution-cast films of urethane substituted polydiacetylenes"; J. Chem. Phys. vol. 71(1), Jul. 1, 1979, p. 206-211.

Shibata, M.; "Reversible Colour Phase Transitions and Annealing Properties of Langmuir-Blodgett Polydiacetylene Films"; Thin Solid Films; vol. 179 (1989) p. 433-437.

Keneko, F. et al.; "Absorption properties and structure changes caused by pre-annealing in polydiacetylene Langmuir-Blodgett films"; Thin Solid Films; vol. 210/211 (1992) p. 548-550.

Rubner, M.F.; "Synthesis and Characterization of Polyurethane-Diacetylene Segmented Copolymers"; Macromolecules 1986, vol. 19, p. 2114-2128.

Rubner, M.F.; "Novel Optical Properties of Polyurethane-Diacetylene Segmented Copolymers"; Macromolecules 1986; vol. 19, p. 2129-2138.

Nallicheri, R.A. et al.; "Thermal and Mechanical Properties of Polyurethane-Diacetylene Segmented Copolymers. 1. Molecular Weight and Annealing Effects"; Macromolecules 1990; vol. 23, p. 1005-1016.

Nallicheri, R.A. et al.; "Thermal and Mechanical Properties of Polyurethane-Diacetylene Segmented Copolymers. 2. Effects of Diacetylene Cross-Polymerization"; Macromolecules 1990; vol. 23, p. 1017-1025.

Hammond, P.T. et al.; "Thermochromism in Liquid Crystaline Polydiacetylenes"; Macromolecules 1997; vol. 30, p. 5773-5782.

(Continued)

*Primary Examiner*—Sanza L. McClendon
(74) *Attorney, Agent, or Firm*—Nancy M. Lambert

(57) ABSTRACT

Polymer blend compositions that include diacetylene segments are provided. The polymers containing diacetylene segments are capable of a calorimetric indication in response to stimuli, such as heat, an analyte or exposure to certain environmental factors, despite being blended with other materials, such as polymers or additives.

28 Claims, No Drawings

OTHER PUBLICATIONS

Oertel, G. (Editor); "Polyurethane, Kunststoff Handbuch 7"; 1983; p. 22-24.

Zorll, U. (Editor); "RÖMPP Lexikon—Lacke und Druckfarben"; 1998; p. 467.

Siemsen, P. et al.; "Acetylenic Coupling: A Powerful Tool in Molecular Construction"; Angewandte Chemie International Edition; 2000; vol. 39 (15); p. 2632-2657.

Miller, J.A. et al.; "Properties of Polyether-Polyurethane Block Copolymers: Effects of Hard Segment Length Distribution"; Macromolecules; 1985; vol. 18, pp. 32-44.

USPTO Office Action dated Jan. 16, 2007; U.S. Appl. No. 10/922,092, filed Aug. 19, 2004; Inventor: Jeffrey J. Cernohous; 7 pages.

* cited by examiner

POLYDIACETYLENE POLYMER BLENDS

BACKGROUND

Polymer compositions that include polydiacetylene segments are used for a variety of applications. Diacetylenes are typically colorless and undergo addition polymerization, either thermally or by actinic radiation. As the polymerization proceeds, these compounds undergo a contrasting color change to blue or purple. When exposed to external stimuli such as heat, physical stress or a change of solvents or counterions, polydiacetylenes exhibit a further color changes produced by distortion of the planar backbone conformation. Polydiacetylene assemblies are known to change color from blue to red with an increase in temperature or changes in pH due to conformational changes in the conjugated backbone as described in Mino, et al., Langmuir, Vol. 8, p. 594, 1992; Chance, et al., *Journal of Chemistry and Physics*, Vol. 71, 206, 1979; Shibutag, *Thin Solid Films*, Vol. 179, p. 433, 1989; Kaneko, et al., *Thin Solid Films*, Vol. 210, 548, 1992; and U.S. Pat. No. 5,672,465. Utilization of this class of compounds is known for use as biochromic indicators as discussed in U.S. Pat. No. 5,622,872 and publication WO 02/00920.

In addition to the polymerization of monomeric diacetylenes, it has been demonstrated that the diacetylene functionality can be incorporated in the repeat structure of a polymer backbone. These types of polymers undergo solid-state cross-polymerization on exposure to U.V. radiation, and form polydiacetylene chains. These materials have been referred to as macromonomers due to the systematic polymerization of the diacetylene units within the backbone structure of the initial polymer. Examples of polymers containing the reactive diacetylene functionality in the repeat structure of the polymer backbone formed by linking the appropriate difunctional monomers together, wherein one of which contains the diacetylene group include the diacetylene-urethane copolymers described in U.S. Pat. Nos. 4,215,208 and 4,242,440; segmented copolymers formed from diisocyanate reacted with elastomeric prepolymer and chain extended with a diacetylene described in U.S Pat. No. 4,721,769; linear block copolymers with a soft segment (polyether, polyester, polydiene, polydimethylsiloxane) and a diacetylene-containing hard segment (Polyurethane, polyamide, polyester, polyurea) as described in U.S. Pat. No. 4,767,826; and polyamide-diacetylene copolymers as described in U.S. Pat. No. 4,849,500 and 4,916,211.

SUMMARY

The present invention is directed to polymer blend compositions, and methods of making and using them, that include a chromogenic copolymer comprising at least two diacetylene segments, and an additive with at least one functional characteristic, wherein the polymer blend exhibits chromogenic characteristics of the diacetylene-containing copolymer and the functional characteristics of the additive. The additives include, but are not limited to, plasticizers, tackifiers, and/or polymer additives such as elastomers.

A chromogenic copolymer is also provided comprising at least two diacetylene segments, a linkage segment; and at least one reactive emulsifying segment. A polymer blend comprising the chromogenic copolymer with at least one reactive emulsifying segment and an additive with at least one functional characteristic is also provided.

In one embodiment, the reactive emulsifying segment is formed from a reactive emulsifying compound represented by the formula V:

wherein G is selected from the group consisting of OH, NHR and SH; each of X and Y may be the same or different; each of X and Y are independently selected from aliphatic organic radicals having from about 1 to about 20 carbon atoms, free of reactive functional groups, and combinations thereof; and wherein R can be hydrogen or an aliphatic organic radical having from about 1 to about 20 carbon atoms, free of reactive functional groups.

In another embodiment, the reactive emulsifying segment is formed from a reactive emulsifying compound represented by the formula IV:

wherein G is selected from the group consisting of OH, NHR and SH; wherein Q is a negatively charged moiety selected from COO$^-$ and SO$_3^-$, or a group that is capable of forming such a negatively charge moiety upon ionization; each of X, Y and R$^1$ may be the same or different; X, Y, R, and R$^1$ are independently selected from aliphatic organic radicals free of reactive functional groups, preferably having from about 1 to about 20 carbon atoms, and combinations thereof; R can be hydrogen; and R$^1$ is optional if Q is COO$^-$ and SO$_3^-$.

As used herein, "a," "an," "the," "at least one," and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments.

DETAILED DESCRIPTION OF ILLUSTRATIVE EMBODIMENTS OF THE INVENTION

The present invention provides polymer blend compositions that include diacetylene segments. In particular, the present invention is directed to polymers containing diacetylene segments that provide a polymer network capable of a calorimetric indication in response to stimuli, such as heat, an analyte or exposure to certain environmental factors, despite being blended with other materials, such as polymers or additives.

The diacetylene segments self assemble to form ordered assemblies that can be polymerized using any actinic radiation such as, for example, electromagnetic radiation in the UV or visible range of the electromagnetic spectrum. The ability of the diacetylene segments to self-assemble into ordered assemblies allows the polymerization to proceed topochemically. The self-assembly of diacetylenes depends in large part on two factors: the molecular architecture of the diacetylene starting materials, and the nature of the copolymer segment. The diacetylene starting materials of this invention are designed to have a molecular architecture which not only enhances but directs their ability to self-assemble, by providing an "engineered" intermolecular affinity for the diacetylene molecules to aggregate into ordered assemblies. An example of a copolymer segment for the diacetylene materials is a polyurethane polymer system that contributes to the self-assembly of the diacetylenes by providing a hydrogen bonding template for the formation of ordered assemblies of diacetylenes.

It is believed that the diacetylene-containing polymers exhibit a color development based on the propensity of the copolymer to self-assemble at the molecular level into ordered morphologies. Consequently, the diacetylene moieties contained within the polymer backbone are aligned to such a degree that cross-linking can occur across the diacetylene functionality, resulting in a conjugated network. The ensuing observed color development can be a direct indication of the degree of conjugation that exists in a particular system. The cross-linked diacetylene in the polymer network provides two material attributes that are desirable in many applications: 1) enhanced integrity, 2) a color development.

Polymerization of the diacetylene components result in polymerization reaction products that have a color in the visible spectrum, i.e., in the wavelength between 400 nm and 600 nm of varying intensity as measured by chroma ($C^*$) and hue as measured by hue angle ($h°$) depending on their conformation and exposure to external factors. $L^*$, $C^*$ and $h°$ are measurements often used in the paint and textile industry to quantify the observed colors and to monitor lot to lot consistency. $L^*$ is the lightness of the color on a scale from 0, or pure black, to 100, or pure white. $C^*$ (chroma) is the saturation or a measure of the intensity of a particular hue or observed color. Chroma may also be defined more formally as the distance of departure of a chromatic color from the neutral (gray) color of the same value. The chroma scale begins at zero, but has no arbitrary end. As the $C^*$ value increases, the relative saturation also increases. Chroma may be best thought of as a quantity, as in a measure of how much of the particular color is present. Hue ($h°$) represents the hue angle of the color represented and ranges from 0° to 360°.

Polymers containing diacetylene components can exhibit a reversible color change and/or a three state color change. For example, after polymerization the resulting blue-phase polymer network can change color to a reddish-orange state upon exposure to heat, a change in solvent or counterion, or physical stress. This reddish-orange polymer network can then change color to a yellowish-orange state upon further exposure to heat, a change in solvent or counterion, or physical stress. Additionally, polymer networks disclosed herein can cycle between these reddish-orange and yellowish-orange states in a reversible manner.

The ability of polydiacetylene-containing polymers to undergo a visible color change upon exposure to a variety of elements, including ultraviolet light, physical stress, a change in solvent and a change in counter ion, for example, make them ideal candidates for the preparation of various sensing devices. Such sensing devices can employ the diacetylene-containing polymers in solution or in their solid state.

The structural requirements of diacetylenic polymer for a given sensing application are typically application specific. Features such as overall chain length, solubility, polarity, crystallinity, and the presence of functional groups for further molecular modification all cooperatively determine a diacetylene containing polymer's ability to serve as a useful sensing material.

The diacetylene compounds can be easily and efficiently polymerized into polydiacetylene-containing polymers that develop a color, such as blue or purple, as the polymerization proceeds. The polydiacetylene-containing polymers can further undergo desired color changes in response to an external stimulus such as heat, a change in solvent or counterion, if available, or physical stress.

Both the color development of the polydiacetylene-containing polymer and the secondary color response of the polydiacetylene-containing polymers to stimuli is a function in part of the inherent degree of self-assembly, or ordering, of the system at the molecular level. The desired level of self-assembly can be facilitated by hydrogen bonding of the copolymer segment, such as polyurethanes. A polymer system that does not drive ordering, such as a material lacking hydrogen bonding sites for spontaneous assembly, is less desirable from a self-assembly perspective.

The present invention provides blends of polydiacetylene-containing polymers with other materials that retain chromogenic characteristics. It may be desirable to blend the polydiacetylene-containing polymers with other materials to meet the objectives of a desired application. In general, the polymer blend will contain the functional characteristics of the additive while retaining the chromogenic characteristics of the diacetylene-containing polymer. As used herein, the term "functional characteristics," means physical characteristics of the additive such as rheological properties (e.g., viscoelasticity, elasticity), mechanical properties (e.g., rigidity hardness), thermal properties, and adhesive properties (e.g., shear strength, adhesion). For example, diacetylene-containing polymers may be blended with tackifiers and/or acrylic polymers to form a pressure sensitive adhesive with a chromogenic response to external stimuli. Depending on the choice of both the diacetylene-containing polymer and the materials added, the color development of the resultant blend can be affected. Polymer blends of the invention are further described below, with reference to certain terms understood by those in the chemical arts as referring to certain hydrocarbon groups. Reference is also made throughout the specification to polymeric versions thereof. In that case, the prefix "poly" is inserted in front of the name of the corresponding hydrocarbon group.

Except where otherwise noted, such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof).

The term "aliphatic group" means a saturated or unsaturated, linear, branched, or cyclic hydrocarbon group. This term is used to encompass alkyl, alkylene (e.g., oxyalkylene), aralkylene, and cycloalkylene groups, for example.

The term "alkylene group" means a saturated, linear or branched, divalent hydrocarbon group. Particularly preferred alkylene groups are oxyalkylene groups.

The term "oxyalkylene group" means a saturated, linear or branched, divalent hydrocarbon group with a terminal oxygen atom.

The term "aralkylene group" means a saturated, linear or branched, divalent hydrocarbon group containing at least one aromatic group.

The term "cycloalkylene group" means a saturated, linear or branched, divalent hydrocarbon group containing at least one cyclic group.

The term "oxycycloalkylene group" means a saturated, linear or branched, divalent hydrocarbon group containing at least one cyclic group and a terminal oxygen atom.

The term "aromatic group" means a mononuclear aromatic hydrocarbon group or polynuclear aromatic hydrocarbon group. The term includes arylene groups.

The term "arylene group" means a divalent aromatic group.

Diacetylene-Containing Polymer

Polyurethane systems are one example of a system that can provide the self-assembly characteristics necessary to contribute to color development during polymerization and contribute to a chromogenic response in the resulting polymer. One polymerization method that can be used to prepare the diacetylene-containing polymer is the polyurethane-based system described in applicant's copending application entitled "Polydiacetylene Polymer Compositions and Methods of Manufacture, U.S. Ser. No. 10/922,092, filed Aug. 19, 2004. Another example of urethane-based diacetylene-segmented copolymer is the two-step solution polymerization technique described in Miller, J. A., Lin, S. B., Hwang, K. S., Wu, K. S., Gibson, P. E., and Cooper, S. L., MACROMOLECULES, 18, (1985).

Other ways of preparing the diacetylene-containing polymer are disclosed in U.S. Pat. Nos. 4,849,500; 4,721,769; and 4,767,826. Prepolymers fitted with suitable reactive end groups such as hydroxyl, carboxyl, amino, etc., can be readily prepared using a number of well established synthetic techniques. For example, the prepolymers can be synthesized by:

1. Free radical polymerization of vinyl monomers with initiators that supply —OH or —COOH end groups such as 4,4' azobis (4-cyano-n-pentanol) and 4,4'-azobis (4-cyanovaleric acid).

2. Cationic polymerization of monomers using dichloro compounds such as p-di(2-chloropropyl) benzene which function as both initiators and transfer agents to produce —Cl end groups which can be readily converted to —OH end groups.

3. Anionic polymerization using bifunctional initiators such as sodium naphthalene which produce reactive end groups that can be subsequently fitted with —OH, —COOH, —COCl end groups by reaction with electrophiles such as ethylene oxide, carbon dioxide, and phosgene, respectively.

4. Step growth polymerization with a slight excess of the monomer containing the functional group desired at the end of the molecule. For example, to obtain —NH$_2$— end groups an excess of the diamine would be used when polymerized with a diacid.

The segmented copolymers are then formed by the reaction of a prepolymer and a diacetylene monomer containing suitable reactive end groups. For example, the following are common functional groups that react to form linkage segments in a polymer chain: alcohol+carboxylic acid=ester linkage; alcohol+isocyanate=urethane linkage; amine+isocyanate=urea linkage; amine+carboxylic acid=amide linkage; carboxylic acid+isocyanate=amide linkage.

The ability of the diacetylene-containing copolymer to exhibit color development will be influenced by the structure of the linkage segment contributed by the prepolymer. In some embodiments, the prepolymer segment is phase separable or is incompatible with the diacetylene-containing segment as described in U.S. Pat. No. 4,721,769.

In addition to the selection of the diacetylene component, the type of polymer used may affect the properties, such as color development, of the resultant diacetylene-containing copolymer. Both the flexibility and the distribution of segments is impacted based on the polymer matrix chosen. The structure of the segments, i.e., the ring substitution and linearity, may also affect the properties, such as color development, of the diacetylene-containing copolymer.

In many embodiments, the diacetylene-containing polymer may contain at least one reactive emulsifying compound. The reactive emulsifying compound contains at least one anionic-functional group, cationic-functional group, a group that is capable of forming an anionic-functional group or cationic-functional group, or mixtures thereof. As used herein, the term "reactive emulsifying compound" describes a compound that acts as an internal emulsifier because it contains at least one ionizable group.

Reactive emulsifying compounds are capable of reacting with at least one of the components to become incorporated into the diacetylene-containing polymers. Thus, the reactive emulsifying compound contains at least one, preferably at least two, active hydrogen-reactive (e.g., hydroxy-reactive) groups. Hydroxy-reactive groups include, for example, isocyanate, hydroxyl, mercapto, and amine groups.

The incorporation of a reactive emulsifying compound in the polymer improves the hydrophilicity of the resulting polymer. For example, the reactive emulsifying compound in the polymer allows for water dispersibility of the resulting polymer. Furthermore, such dispersions do not generally require external emulsifiers, such as surfactants, for stability.

Preferably, a sufficient amount of reactive emulsifying compound is reacted such that an external emulsifier is not necessary for preparing a storage-stable diacetylene-containing polymer comprises about 0.5 to about 5 weight percent, more preferably about 0.75 to about 3 weight percent, of segments derived from the reactive emulsifying compound. If polyols containing polyethylene oxide are used, the amount of reactive emulsifying compound used in this preferred embodiment may be less to form a stable dispersion.

In certain embodiments, the reactive emulsifying compound contains at least one anionic-functional group or group that is capable of forming such a group (i.e., an anion-forming group) when reacted with other polymer components. The anionic-functional or anion-forming groups of the reactive emulsifying compound can be any suitable group that contributes to ionization of the reactive emulsifying compound. For example, suitable groups include carboxylate, sulfate, sulfonate, phosphate, and similar groups.

The preferred structure for reactive emulsifying compounds with anionic-functional groups is generally represented by Formula IV:

(IV)

wherein G is OH, NHR or SH and wherein Q is a negatively charged moiety selected from COO$^-$ and SO$_3^-$, or a group that is capable of forming such a negatively charge moiety upon ionization. Each of X, Y, and R$^1$ may be the same or different. X, Y, R, and R$^1$ are independently selected from aliphatic organic radicals free of reactive functional groups (e.g., alkylene groups that are free of reactive functional groups), preferably having from about 1 to about 20 carbon atoms, and combinations thereof, with the provisos that: (i.) R can be hydrogen; and (ii.) $R^1$ is not required if Q is COO⁻ and $SO_3^-$.

As an example, dimethylolpropionic acid (DMPA) is a useful reactive emulsifying compound for certain embodiments of the invention. Furthermore, 2,2-dimethylolbutyric acid, dihydroxymaleic acid, and sulfopolyester diol are other useful reactive emulsifying compounds.

In certain embodiments, the reactive emulsifying compound contains at least one cationic-functional group or group that is capable of forming such a group (i.e., a cation-forming group) when reacted with other polymer components. The cationic-functional or cation-forming groups of the reactive emulsifying compound can be any suitable group that contributes to ionization of the reactive emulsifying compound. In most embodiments, the reactive emulsifying compound is an amine.

The preferred structure for reactive emulsifying compounds with cationic-functional groups is generally represented by Formula V:

(V)

wherein G is OH, NHR or SH. Each of X and Y may be the same or different. X, Y, and R are independently selected from aliphatic organic radicals free of reactive functional groups (e.g., alkylene groups that are free of reactive functional groups), preferably having from about 1 to about 20 carbon atoms, and combinations thereof, with the proviso that R can be hydrogen.

Depending on the desired application, anionic or cationic reactive-emulsifying compounds may be preferable. For example, when used in biological applications, it may be preferred that the reactive emulsifying agent contain a cationic-functional group. In those circumstances, the cationic feature of the polymer may minimize the potential for interaction with other additives, such as antimicrobials. This may be a particular concern, for example, in medical applications.

Other useful compounds for the reactive emulsifying compounds include those described as water-solubilizing compounds in U.S. Pat. No. 5,554,686, which is incorporated herein by reference. Those of ordinary skill in the art will recognize that a wide variety of reactive emulsifying compounds are useful in the present invention.

Polymer Additives

The diacetylene-containing polymer can be blended with other polymers, such as elastomers, to obtain a resultant blend with the desired functional characteristics of both the diacetylene-containing polymer and the polymer additive. In general, the diacetylene-containing polymer comprises greater than 5 wt % of the polymer blend. In preferred embodiments, the diacetylene-containing polymer comprises greater than 10 wt % of the polymer blend. The amount of diacetylene-containing polymer in the resultant blend can be affected by the number of diacetylene segments in the diacetylene-containing polymer or the propensity of the diacetylene-containing polymer to self-assemble.

Specific examples of suitable polymer additives may include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable may be copolymers, e.g., copolymers of PEN (coPEN) (e.g., copolymers of 2,6-, 1,4-, 1,5-, 2,7-, and/or 2,3-naphthalene dicarboxylic acid, or esters thereof, with (a) terephthalic acid, or esters thereof (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanel diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol.

Exemplary non-fluorinated polymers may include polyamides, polyolefins, polyethers, polyurethanes, polyesters, polyimides, polystyrene, polycarbonates, polyketones, polyureas, acrylics, and mixtures thereof, and the like. In some embodiments, a non-fluorinated polymer may be a non-fluorinated elastomer, such as acrylonitrile butadiene rubber (NBR), butadiene rubber, chlorinated and chlorosulfonated polyethylene, chloroprene, ethylene-propylene monomer (EPM) rubber, ethylene-propylene-diene monomer (EPDM) rubber, epichlorohydrin (ECO) rubber, polyisobutylene, polyisoprene, polysulfide, polyurethane, silicone rubber, blends of polyvinyl chloride and NBR, styrene butadiene (SBR) rubber, ethylene-acrylate copolymer rubber, and ethylene-vinyl acetate rubber. Suitable ethylene-vinyl acetate copolymers may include ELVAX, available from E.I du Pont de Nemours and Co. (Wilmington, Del.).

Many polyamides that may also be useful as non-fluorinated polymers are generally commercially available. For example, polyamides, such as any of the well known nylons are available from a number of sources. Particularly desirable polyamides may be nylon-6, nylon-6,6, nylon-11, and nylon-12. It should be noted that the selection of a particular polyamide material should be based upon the physical requirements of the particular application. For example, nylon-6 and nylon-6,6 offer better heat resistance properties than nylon-11 and nylon-12, whereas nylon-11 and nylon-12 offer better chemical and moisture resistance properties. In addition, other nylon materials, such as nylon-6,12, nylon-6,9, nylon-4, nylon-4,2, nylon-4,6, nylon-7, and nylon-8 may be used, as well as ring-containing polyamides, such as nylon-6, T and nylon-6,1. Suitable nylons include VESTAMID L2140, a nylon-12, available from Creanova, Inc. (Somerset, N.J.). Polyether-containing polyamides having the trade designation PEBAX, available from Atochem North America (Philadelphia, Pa.) may also be used.

Useful polyurethanes may include aliphatic, cycloaliphatic, aromatic, and polycyclic polyurethanes. These polyurethanes are typically produced by reaction of a polyfunctional isocyanate with a polyol according to well known reaction mechanisms. Useful diisocyanates for employment in the production of a polyurethane include 4,4'-dicyclohexylmethane diisocyanate, isophorone diisocyanate, 1,6-hexamethylene diisocyanate, 1,4-cyclohexylene diisocyanate, and 4,4'-diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders, such as butanediol or hexanediol may also be used in the reaction. Useful commercially available urethane polymers include MORTHANE L424.167 (MI=9.7), PN-04 or 3429, from Morton International (Seabrook, N.H.), and X-4107 from B.F. Goodrich Co. (Cleveland, Ohio).

Useful polyolefins may include homopolymers of ethylene, propylene, and the like, as well as copolymers of these monomers with, for example, acrylic monomers and other ethylenically unsaturated monomers, such as vinyl acetate and higher alpha-olefins. Such polymers and copolymers may be prepared by conventional free radical polymerization or catalysis of such ethylenically unsaturated monomers. The degree of crystallinity of the polymer may vary. The polymer may, for example, be a semi-crystalline high density polyethylene or may be an elastomeric copolymer of ethylene and propylene. Carboxylic acid, anhydride, or imide functionalities may be incorporated into the polymer by polymerizing or copolymerizing functional monomers, such as acrylic acid or maleic anhydride, or by modifying the polymer after polymerization, e.g., by grafting, by oxidation, or by forming ionomers. Examples include acid modified ethylene acrylate copolymers, anhydride modified ethylene vinyl acetate copolymers, anhydride modified polyethylene polymers, and anhydride modified polypropylene polymers. Such polymers and copolymers generally are commercially available, for example, under the trade designations ENGAGE (Dow-DuPont Elastomers, Wilmington, Del.) or EXACT (ExxonMobil, Linden, N.J.). Suitable anhydride modified polyethylene polymers are commercially available from E.I. du Pont de Nemours and Co. (Wilmington, Del.), under the trade designation BYNEL co-extrudable adhesive resins.

Useful acrylics may include polymers of acrylic acid, methyl acrylate, ethyl acrylate, acrylamide, methacrylic acid, methyl methacrylate, ethyl methacrylate, and the like, and mixtures thereof.

Useful polycarbonates may include aliphatic polycarbonates, such as polyester carbonates, polyether carbonates, and bisphenol A-derived polycarbonates, and the like.

Useful polyimides may include polyimide polymers made from the anhydride of pyromellitic acid and 4,4'-diamino-diphenyl ether, available from E.I. du Pont de Nemours and Co. under the trade designation KAPTON. Variations include KAPTON H, KAPTON E, and KAPTON V, among others.

Additional examples of useful non-fluorinated polymers, as noted above, include polyesters, polycarbonates, polyketones, and polyureas. Exemplary commercially available polymers include polyesters having the trade designation SELAR (E.I. du Pont de Nemours and Co.), polycarbonates having the trade designation LEXAN (General Electric Co., Pittsfield, Mass.), polyketones having the trade designation KADEL (Amoco Corp., Chicago, Ill.), and polyureas having the trade designation SPECTRIM (Dow Chemical Co., Midland, Mich.).

Exemplary commercially available elastomers include those having the trade designations NIPOL 1052 NBR, HYDRIN C2000 epichlorohydrin-ethylene oxide rubber, and ZETPOL hydrogenated NBR (Zeon Chemical, Louisville, Ky.); HYPALON 48 chlorosulfonated polyethylene rubber and VAMAC ethylene-acrylate elastomer (E.I. du Pont de Nemours and Co., Wilmington, Del.); NORDEL EPDM (R.T. Vanderbilt Co., Inc., Norwalk, Conn.); KRYNAC NBR, PERBUNAN NBR/PVC blend and THERBAN hydrogenated NBR (Bayer Corp., Pittsburgh, Pa.); SANTOPRENE thermoplastic elastomers (Advanced Elastomer Systems, Akron, Ohio); KRATON thermoplastic elastomers (Shell Chemical Co., Houston, Tex.); and KELTAN EPDM (DSM Elastomers Americas, Addis, La.).

The desired properties of the diacetylene-containing polymer blend must be balanced. Increased amounts of the polymer additive can cause a dilution affect that may weaken the color development of the resulting diacetylene-containing polymer/additive blend. This dilution effect can be minimized by increasing the relative diacetylene segments in the diacetylene-containing polymer. On the other hand, excessive amounts of diacetylene-containing polymer may minimize or mask the desired properties of the polymer additive.

Pressure Sensitive Adhesives

The diacetylene-containing polymer, or the diacetylene-containing polymer blend, can be blended with tackifiers and plasticizers to form pressure sensitive adhesive compositions (PSA) without compromising the inherent chromogenicity of the diacetylene-containing polymer. For example, compatible tackifiers and/or plasticizers may be added to aid in optimizing the ultimate tack and peel properties of the diacetylene-containing PSA. In general, the diacetylene-containing polymer, or its polymer blend, comprises at least 30% of the PSA composition.

The use of such tack-modifiers is common in the art, as is described in the Handbook of Pressure Sensitive Adhesive Technology, edited by Donatas Satas (1982). Examples of useful tackifiers include, but are not limited to, rosin, rosin derivatives, polyterpene resins, coumarone-indene resins, and the like. Plasticizers which may be added to the adhesive of the invention may be selected from a wide variety of commercially available materials. Representative plasticizers include polyoxyethylene aryl ether, dialkyl adipate, 2-ethylhexyl diphenyl phosphate, t-butylphenyl diphenyl phosphate, 2-ethylhexyl adipate, toluenesulfonamide. dipropylene glycol dibenzoate, polyethylene glycol dibenzoate, polyoxypropylene aryl ether, dibutoxyethoxyethyl formal, and dibutoxyethoxyethyl adipate. UV stabilizers as known in the art may also be added.

Other materials may also be added to obtain desired characteristics in the diacetylene-containing PSA. For example, fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like can be added, generally in amounts up to about 50 parts per hundred parts by weight of the diacetylene-containing polymer, provided that such additives are not detrimental to the properties desired in the final PSA composition.

Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these compositions, generally in amounts of from about 1 to about 50 percent by total volume of the composition.

Applications

Once the polymer blend is formed, it is easily applied to a substrate and then dried to form a coating. Drying can be carried out either at room temperature (i.e., about 20° C.) or at elevated temperatures (e.g., about 25° C. to about 150° C.). Drying can optionally include using forced air or a vacuum. This includes the drying of static-coated substrates in ovens, such as forced air and vacuum ovens, or drying of coated substrates that are continuously conveyed through chambers heated by forced air, high-intensity lamps, and the like. Drying may also be performed at reduced (i.e., less than ambient) pressure.

A coating of the diacetylene-containing polymer blend can be formed on a wide variety of substrates. For example, the coating can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., polypropylene (e.g., biaxially oriented polypropylene (BOPP)), polyethylene, polyurea, polyurethane, or polyester (e.g., polyethylene terephthalate)), or release liner (e.g., siliconized liner).

Where post-crosslinking of the coated polymer is desirable, aminosilanes can be used. Upon coating and drying the polymer blend, the aminosilanes will allow crosslinking to occur.

Exposure of the diacetylene-containing polymer, and/or the polymer blend, to radiation results in a color development from clear to typically red or blue. Radiation sources include UV, gamma, electron-beam (e-beam), and solar sources. In most embodiments, an ultraviolet (UV) radiation source is used to cure the polymers. The color development observed in the polymer is independent of the irradiation source utilized, but color intensity, i.e., chroma, is determined in part by the dosage applied.

The polymer can exhibit a post-radiation, or secondary chromogenic, in response to stimuli such as to solvents (solvatochromism), temperature change (thermochromism) and applied stress (piezochromism). Upon exposure to the stimuli, the polymer network undergoes yet another color change from the developed color to a secondary color, such as yellow. This secondary color change may be reversible, depending on the selection of the starting materials.

Time for development of color may affect the selection of starting materials. For those applications where rapid color development is not critical, longer time to allow self-assembly of the polymer system may allow the use of a greater range of starting materials.

Objects and advantages of this invention are further illustrated by the following examples, but the particular materials and amounts thereof recited in these examples, as well as other conditions and details, should not be construed to unduly limit this invention.

EXAMPLES

These examples are merely for illustrative purposes only and are not meant to be limiting on the scope of the appended claims. All parts, percentages, ratios, etc. in the examples and the rest of the specification are by weight, unless noted otherwise. Furthermore, molecular weights in the examples and the rest of the specification are weight average molecular weights, unless noted otherwise. Solvents used were obtained from Aldrich Chemical Company; Milwaukee, Wis.

180° Peel Adhesion

This peel adhesion test is similar to the test method described in ASTM D 3330-90, substituting a glass substrate for the stainless steel substrate described in the test. This test will be referred to as the "glass substrate peel adhesion test" for the purposes of this document. PSA tapes, were cut into 1.27-centimeter by 15-centimeter strips. Each strip was then adhered to a 10 centimeter by 20 centimeter clean, solvent-washed glass coupon by passing a 2-kilogram roller once over the strip. The bonded assembly dwelled at room temperature for about one minute.

Each sample so prepared was tested for 180° peel adhesion using an IMASS slip/peel tester (Model 3M90, commercially available from Instrumentors Inc.; Strongsville, Ohio) at a rate of 2.3 meters/minute (90 inches/minute) using a two second data collection time and/or at a rate of 30.5 centimeters/minute (12 inches/minute) using a five second data collection time. Two samples of each composition were tested. The reported peel adhesion value is an average of the peel adhesion value from each of the two samples.

Shear Strength

This shear strength test is similar to the test method described in ASTM D 3654-88. PSA tapes, prepared as described above, were cut into 1.27-centimeter by 15-centimeter strips. Each strip was then adhered to a stainless steel panel such that a 1.27-centimeter by 1.27-centimeter portion of each strip was in firm contact with the panel and one end portion of the strip hung free.

The panel with the attached strip was placed in a rack such that the panel formed an angle of 178° with the extended free end of the strip. The strip was tensioned by application of a force of one kilogram applied as a hanging weight from the free end of the strip. The 2° less than 180° was used to negate any peel forces, thus ensuring that only shear strength forces were measured, in an attempt to more accurately determine the holding power of the tape being tested.

The elapsed time for each tape sample to separate from the test panel was recorded as the shear strength. Each test was terminated at 10,000 minutes, unless the adhesive failed at an earlier time (as noted).

| Abbreviation or Trade Designation | Description |
|---|---|
| ACCLAIM 4220N | A polyethylene oxide-capped polypropylene oxide diol with an approximate molecular weight of 4,000 grams/mole and an OH equivalent weight of approximately 2,000 grams/mole, commercially available from Bayer Corp., Pittsburgh, PA |
| DBTDL | Dibutyltindilaurate, commercially available from Aldrich Chemical Company; Milwaukee, Wisconsin |
| HDI | Hexamethylene diisocyanate, commercially available from Aldrich Chemical Company; Milwaukee, Wisconsin |
| DAD | Diacetylene diol with the structure HO(CH$_2$)$_n$C≡CC≡C(CH$_2$)$_n$OH defined by the value of n. |
| THF | Tetrahydrofuran |
| Shell L-2203 | A polyethylene/polybutylene dihydroxy terminated oligomer with an approximate molecular weight of 3500 grams/mole available from Shell Chemical Co., Houston, TX. |
| Escorez 1310 | An aliphatic hydrocarbon resin available from Exxon Chemical; Houston, TX. |
| Hercules R1125 | A fully hydrogenated hydrocarbon resin with ~5% aromaticity available from Hercules Inc.; Wilmington, DE |
| Hercules R9100 | A partially hydrogenated hydrocarbon resin with ~5% aromaticity available from Hercules Inc.; Wilmington, DE |
| Block Copolymer | A high molecular weight (>1,000,000 grams/mol) styrene/isoprene star block copolymer comprised of radially extending polyisoprene chains possessing a polystyrene tail. The polystyrene comprises ~9% of the bulk. |
| PBHTO | Polybutadiene dihydroxyl terminated oligomer |
| Meq | Milliequivalents |
| FPM | Feet per minute |
| PEG | Polyethylene glycol oligomer of 400 molecular weight |
| H-12 MDI | 4,4'-methylenebis(cyclohexylisocyanate) |
| PET | Polyethylene terephthalate |

Table of Abbreviations

Synthesis Example 1

To facilitate handling, Shell L-2203 was placed into a convection oven at about 40° C. for about 45 minutes. A glass reaction vessel containing a magnetic stir bar and fitted with a thermometer and a reflux condenser was purged with nitrogen and a nitrogen inlet was placed on the condenser. To this vessel was added Shell L-2203 (41.12 grams, 23.85 meq), DAD n=4 (i.e. 5,7-dodecadiyn-1,12-diol) (0.9720 grams, 10.02 meq) and THF (dried by passing through basic alumina) (200 milliliters). The mixture was stirred with gentle heating to dissolve the diols and HDI (2.85 grams, 33.87 meq) and 1 drop of DBTDL was added. The mixture was allowed to react under reflux conditions (~65° C.) for about 19 hours. The resultant polymer had a number average molecular weight ($M_n$) of 34,000.

Synthesis Example 2

A glass reaction vessel containing a magnetic stir bar and fitted with a thermometer and a reflux condenser was purged with nitrogen and a nitrogen inlet was placed on the condenser. To this vessel was added toluene (purified by passing through basic alumina) (30 milliliters) and HDI (1.262 grams, 15.0 meq). Into an argon purged addition funnel, was placed toluene (purified by passing through basic alumina) (15 milliliters) and PBHTO (7.5 grams, 7.5 meq). The addition funnel was attached to the reaction vessel, 1 drop of DBTDL was added to the HDI solution, the PBHTO solution was added dropwise to the HDI solution over a period of about one hour and the reaction vessel was heated to reflux temperature (about 110° C.). The mixture was allowed to react under reflux conditions for about 3 hours. DAD n=4 (i.e. 5,7-dodecadiyn-1,12-diol) (0.7275 grams, 7.5 meq) was added to the reaction vessel and the contents were allowed to react an additional 3 hours at about 60° C. The resultant polymer had a number average molecular weight ($M_n$) of 8,300.

Synthesis Example 3

A stock solution of ACCLAIM 4220N and DAD n=4 (i.e. 5,7-dodecadiyn-1,12-diol) was prepared in THF in a weight ratio of ACCLAIM 4220N:DAD of 97:3. A stock solution of HDI in THF was also prepared. These stock solutions were attached via canulas to a Bohdan combinatorial reactor. The stock solutions were used to deliver the desired quantity of OH (combination of ACCLAIM 4220N and DAD) and NCO (HDI). The amount of total OH was 0.60 meq and the amount of total NCO was 0.60 meq. The resultant polymer had a molecular weight Mn of 22,500.

Synthesis Example 4

The same procedure described for Synthesis Example 3 was followed except that the amount of total OH was 0.58 meq and the amount of total NCO was 0.60 meq. The resultant polymer had a molecular weight $M_n$ of 90,700.

Examples 1-9 and Comparative Example C1

Part I: Optical Screening of PSA Blends

To test the optical properties of blends of the polymer prepared in Synthesis Example 1 with tackifiers, samples of the polymer and the polymer blended with tackifier were prepared as 20% solids solutions in THF as described in Table 1. The dispersions described in the following examples were coated using a knife coater on nitrogen corona treated PET to a dry film thickness of 51 micrometers (2 mils). The coated films were dried at 70° C. for ten minutes and stored at 23° C. and 50% R. H. overnight. The films were UV irradiated using a 300 W H lamp, one pass at 80 FPM. The color of the coating before and after UV irradiation was noted as well as the Chroma values. Chroma values (C*) were determined before and after exposure using a X-Rite spectrodensitometer, model #528L (C* is representative of the amount of color present in a sample).

TABLE 1

| Example | Tackifer Identity | Ratio of Polymer from Synthesis Example 1/ Tackifier (by weight) | Color pre-UV (C*) | Color post-UV (C*) |
|---|---|---|---|---|
| 1 | Escorez 1310 | 50/50 | 0 | 13.78 |
| 2 | Escorez 1310 | 66.7/33.3 | 0 | 29.37 |
| 3 | Escorez 1310 | 80/20 | 0 | 43.79 |
| 4 | Hercules R1125 | 50/50 | 0 | 36.04 |
| 5 | Hercules R1125 | 66.7/33.3 | 0 | 48.27 |
| 6 | Hercules R1125 | 80/20 | 0 | 59.20 |

TABLE 1-continued

| Example | Tackifer Identity | Ratio of Polymer from Synthesis Example 1/ Tackifier (by weight) | Color pre-UV (C*) | Color post-UV (C*) |
|---|---|---|---|---|
| 7 | Hercules R9100 | 50/50 | 0 | 25.93 |
| 8 | Hercules R9100 | 66.7/33.3 | 0 | 44.65 |
| 9 | Hercules R9100 | 80/20 | 0 | 57.26 |
| C1 | None | 100/0 | 0 | 68.63 |

Part II: PSA Tape Testing

Tape samples of the polymer from Synthesis Example 1 and the blends of the polymer from Synthesis Example 1 and tackifiers described above were prepared and tested for 180° Peel and Shear Strength using the test methods described above, the data are presented in Table 2.

TABLE 2

| Example | Peel before UV cure (N/dm) | Shear Strength before UV cure (minutes) | Peel after UV cure (N/dm) | Shear Strength after UV cure (minutes) |
|---|---|---|---|---|
| 1 | 24.5 | 10,000 | 14.9 | 10,000 |
| 2 | 34.1 | 8,422 | 25.4 | 5,188 |
| 3 | 24.1 | 3,498 | 12.7 | 2,351 |
| 4 | 1.1 | 10,000 | 0.4 | 10,000 |
| 5 | 5.9 | 10,000 | 2.8 | 10,000 |
| 6 | 15.3 | 10,000 | 9.6 | 9,528 |
| 7 | 31.3 | 10,000 | 32.4 | 10,000 |
| 8 | 40.3 | 7,546 | 34.4 | 4,634 |
| 9 | 21.0 | 5,812 | 12.3 | 4,390 |
| C1 | 5.3 | 10,000 | 2.8 | 10,000 |

Example 10

A solution of 95 parts by weight of Block Copolymer and 5 parts by weight of the polymer prepared in Synthesis Example 2 was prepared in toluene, coated onto a silicone release liner, dried for 10 minutes at 70° C. and UV irradiated using a 600 W cure line, one pass at 80 FPM. The material turned blue.

Examples 11-15

A series of blends of the polymers of Synthesis Example 3 and Synthesis Example 4 were prepared in toluene according to the ratios shown in Table 3. The blends were coated onto a silicone release liner, dried for 10 minutes at 70° C. and UV irradiated using a 600 W cure line, one pass at 80 FPM. The observed color change is listed in Table 3.

TABLE 3

| Example | Relative amount of Polymer from Synthesis Example 3 (parts by weight) | Relative amount of Polymer from Synthesis Example 4 (parts by weight) | Color change |
|---|---|---|---|
| 11 | 2 | 1 | Blue |
| 12 | 1 | 2 | Blue |
| 13 | 1 | 3 | Blue |
| 14 | 1 | 4 | Blue |
| 15 | 1 | 6 | Light Blue |

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A polymer blend, comprising:
   a chromogenic copolymer comprising at least two diacetylene segments linked by ester linkages,
   and an additive with at least one functional characteristic;
   wherein the polymer blend exhibits chromogenic characteristics of the diacetylene-containing copolymer and the functional characteristics of the additive.

2. The polymer blend of claim 1, wherein the additive is a tackifier.

3. The polymer blend of claim 1, wherein the additive is a polymer.

4. The polymer blend of claim 1, wherein the chromogenic characteristics are reversible.

5. The polymer blend of claim 1, wherein the functional characteristic is an adhesive characteristic of the additive.

6. The polymer blend of claim 5, wherein the adhesive characteristic is selected from the group consisting of tensile strength, adhesion, peel strength, and cohesive strength.

7. A polymer blend, comprising a chromogenic copolymer
   comprising at least two diacetylene segments, a linkage segment; and at least one reactive emulsifying segment; and
   an additive with at least one functional characteristic;
   wherein the polymer blend exhibits chromogenic characteristics of the diacetylene-containing copolymer and the functional characteristics of the additive.

8. The polymer blend of claim 7, wherein the additive is a tackifier.

9. The polymer blend of claim 7, wherein the additive is a polymer.

10. The polymer blend of claim 7, wherein the chromogenic characteristics are reversible.

11. A polymer blend of claim 7, wherein the diacetylene segments are linked by urethane linkages.

12. The polymer blend of claim 7, wherein the diacetylene segments are linked by ester linkages.

13. The polymer blend of claim 7, wherein the diacetylene segments are linked by amide linkages.

14. The polymer blend of claim 7, wherein the functional characteristic is an adhesive characteristic of the additive.

15. The polymer blend of claim 14, wherein the adhesive characteristic is selected from the group consisting of tensile strength, adhesion, peel strength, and cohesive strength.

16. The polymer blend of claim 7, wherein the reactive emulsifying segment is formed from a reactive emulsifying compound represented by the formula V:

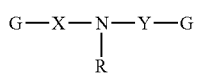

(V)

wherein G is selected from the group consisting of OH, NHR and SH;

wherein each of X and Y may be the same or different;

wherein each of X and Y are independently selected from aliphatic organic radicals having from about 1 to about 20 carbon atoms, free of reactive functional groups, and combinations thereof; and wherein R can be hydrogen or an aliphatic organic radical having from about 1 to about 20 carbon atoms, free of reactive functional groups, and combinations thereof.

17. The polymer blend of claim 7, wherein the reactive emulsifying segment is formed from a reactive emulsifying compound represented by the formula IV:

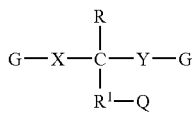

(IV)

wherein G is selected from the group consisting of OH, NHR and SH;

wherein Q is a negatively charged moiety selected from $COO^-$ and $SO_3^-$, or a group that is capable of forming such a negatively charge moiety upon ionization;

each of X, Y and $R^1$ may be the same or different;

X, Y, R, and $R^1$ are independently selected from aliphatic organic radicals free of reactive functional groups, preferably having from about 1 to about 20 carbon atoms, and combinations thereof;

R can be hydrogen; and $R^1$ is optional if Q is $COO^-$ and $SO_3^-$.

18. The polymer blend of claim 7 wherein the diacetylene segment comprises the general structure

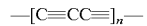

wherein n is 1 to 9.

19. The polymer blend of claim 11 wherein at least 80% of the linkages between diacetylene segments are urethane and urea linkages.

20. The polymer blend of claim 19 wherein at least 95% of the linkages between diacetylene segments are urethane and urea linkages.

21. A pressure sensitive adhesive comprising the polymer blend of claim 7.

22. The pressure sensitive adhesive of claim 21, wherein the adhesive exhibits a chromogenic response when exposed to an external stimulus.

23. A polymer blend, comprising:

a chromogenic copolymer comprising at least two diacetylene segments linked by amide linkages, and an additive with at least one functional characteristic;

wherein the polymer blend exhibits chromogenic characteristics of the diacetylene-containing copolymer and the functional characteristics of the additive.

24. The polymer blend of claim 23, wherein the additive is a tackifier.

25. The polymer blend of claim 23, wherein the additive is a polymer.

26. The polymer blend of claim 23, wherein the chromogenic characteristics are reversible.

27. The polymer blend of claim 23, wherein the functional characteristic is an adhesive characteristic of the additive.

28. The polymer blend of claim 27, wherein the adhesive characteristic is selected from the group consisting of tensile strength, adhesion, peel strength, and cohesive strength.

* * * * *

UNITED STATES PATENT AND TRADEMARK OFFICE
CERTIFICATE OF CORRECTION

PATENT NO. : 7,371,511 B2  Page 1 of 1
APPLICATION NO. : 10/922091
DATED : May 13, 2008
INVENTOR(S) : Steven D. Koecher It is certified that error appears in the above-identified patent and that said Letters Patent is hereby corrected as shown below:

On the Title Page, in Column 2, under (Other Publications)
Line 14, delete "Keneko" and insert -- Kaneko --, therefor.

On the Title Page, in Column 2, under (Abstract)
Line 3, delete "calorimetric" and insert -- colorimetric --, therefor.

Column 1
Line 43, delete "sofi" and insert -- soft --, therefor.

Column 2
Line 58, delete "calorimetric" and insert -- colorimetric --, therefor.

Column 8
Line 30, after "thereof" insert -- ; --.

Column 9
Line 46, delete "afier" and insert -- after --, therefor.
Line 46, delete "grafling" and insert -- grafting --, therefor.

Signed and Sealed this

Twenty-second Day of July, 2008

JON W. DUDAS
*Director of the United States Patent and Trademark Office*